Jan. 23, 1934.　　　　　H. C. KALWITZ　　　　　1,944,661
OIL FILLED BUS AND SWITCH GEAR
Filed Sept. 4, 1930　　　7 Sheets-Sheet 1

Witness:
William P. Kilroy

Inventor:
Herman C. Kalwitz
By Brown, Jackson, Boettcher & Dienner
Attys.

Jan. 23, 1934.  H. C. KALWITZ  1,944,661
OIL FILLED BUS AND SWITCH GEAR
Filed Sept. 4, 1930  7 Sheets-Sheet 2

Witness:
William P. Kilroy

Inventor
Herman C. Kalwitz
By Brown Jackson Boettcher Dienner
Attys

Jan. 23, 1934.　　　H. C. KALWITZ　　　1,944,661
OIL FILLED BUS AND SWITCH GEAR
Filed Sept. 4, 1930　　　7 Sheets-Sheet 3

Jan. 23, 1934.  H. C. KALWITZ  1,944,661
OIL FILLED BUS AND SWITCH GEAR
Filed Sept. 4, 1930   7 Sheets-Sheet 4
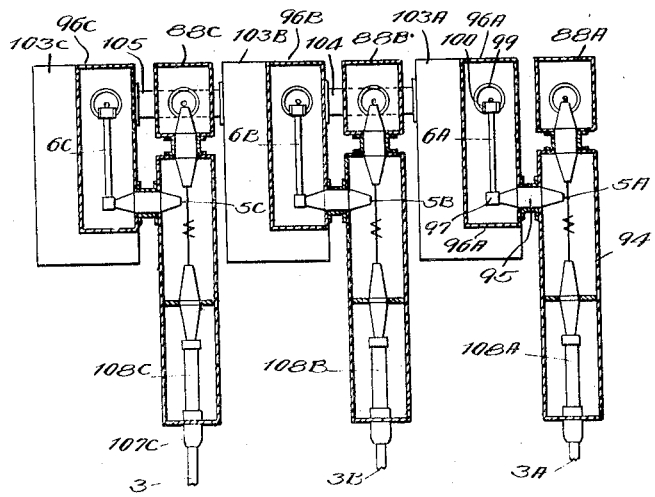
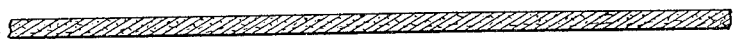
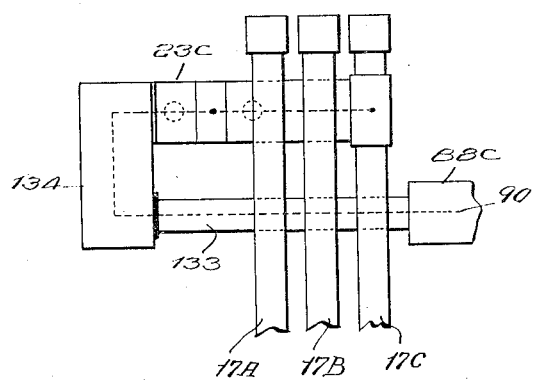

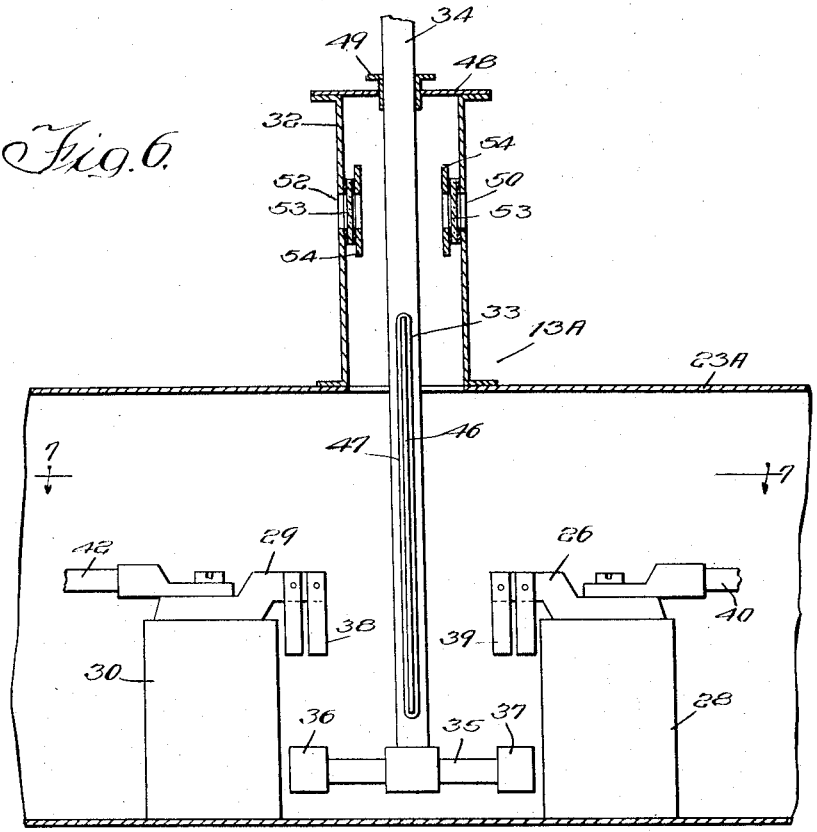
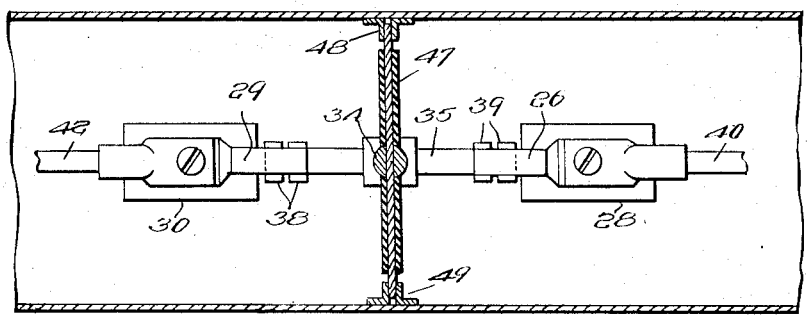

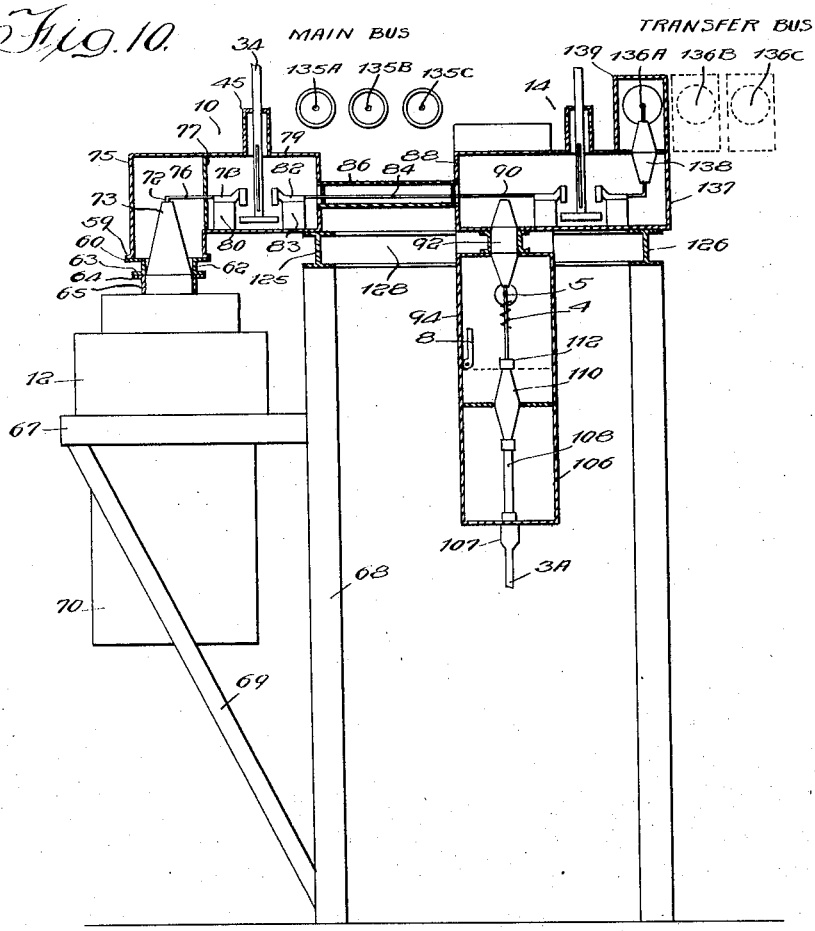
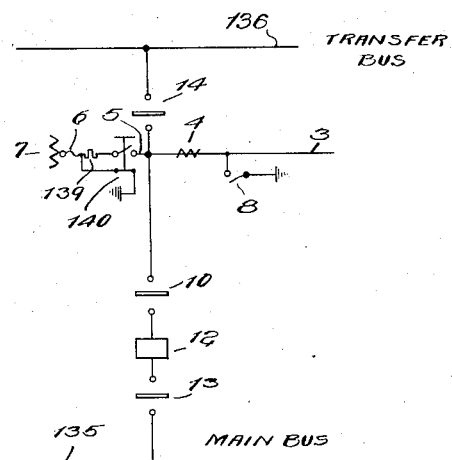

Jan. 23, 1934.  H. C. KALWITZ  1,944,661
OIL FILLED BUS AND SWITCH GEAR
Filed Sept. 4, 1930  7 Sheets-Sheet 7
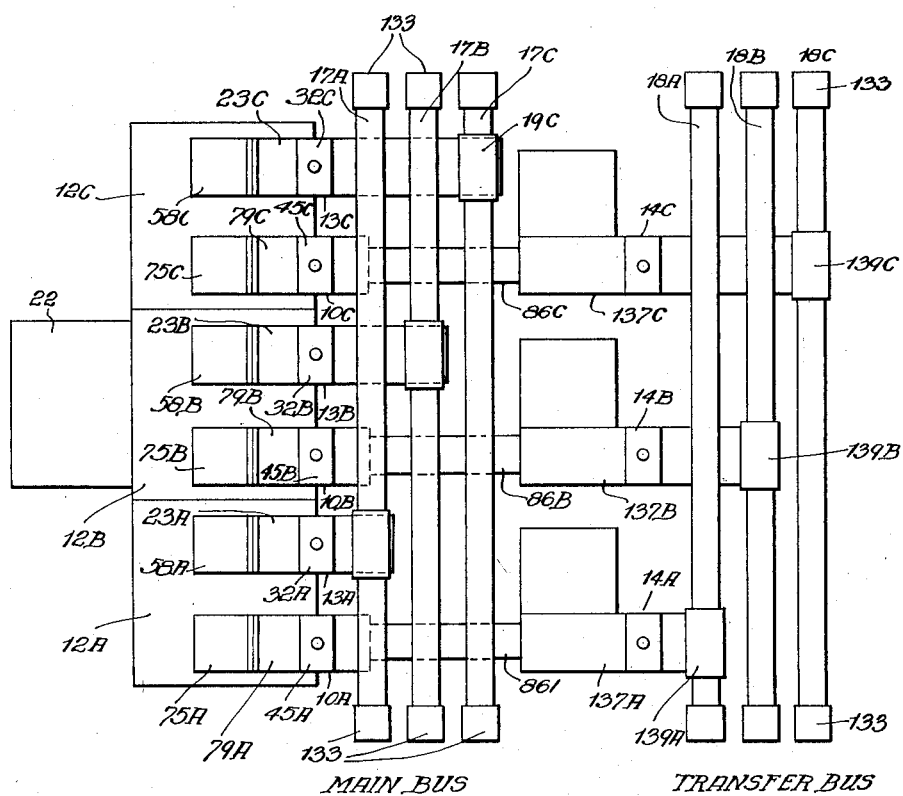

Patented Jan. 23, 1934

1,944,661

UNITED STATES PATENT OFFICE 1,944,661

OIL FILLED BUS AND SWITCH GEAR

Herman C. Kalwitz, Park Ridge, Ill.

Application September 4, 1930. Serial No. 479,624

23 Claims. (Cl. 175—298)

My invention relates to bus and switch stations such as are employed in electric power systems. Such a station involves, primarily, a set of conductors—bus conductors—to which power is delivered, as from an incoming line or generator, and from which it is distributed to outgoing lines for further subdivision and, finally, for consumption. The station involves essentially the idea of subdivision of the energy, and it is customary to group protective, switching and metering apparatus at the station. Regulation apparatus may also be grouped at this point.

Because of the economy involved, the generation of electricity is concentrated in large units. Generally this means that a greater area must be included to make up a suitable aggregate load for a large generating unit. Transmission at high voltage makes widespread distribution feasible because of its efficiency of transmission. At the generating station and at points where power in considerable quantity and at high tension is to be subdivided, such bus and switch stations are required.

The primary requirement in the design of such a station is the ability to perform the service required, i. e., the suitable subdivision of the received power with substantially no interruptions to service. To do this requires not only the ability to do the normal thing required,—i. e., transmit the power, but also to be free of the danger of the abnormal thing. In other words, the station must not only operate to perform its normal operations, but it must be safe against damage to itself and connected lines and apparatus and also to attendants and others that may come in proximity to the same. Safety is of very great importance.

A further important factor is the cost at which the above qualities are secured. Cost must be considered from the standpoint of unit power delivered to the consumer. This involves two main factors, the fixed cost or investment upon which interest must be charged and against which amortization must be charged, and the running cost or cost of operation.

In recent years there has been developed a distinct design of station which fulfills the above requirements better than any heretofore known. This design has come to be known as the oil filled bus design. (See the patent to Rossman No. 1,753,219).

It is a relatively new development in the electric power distribution art, but has already proven its adaptability to various requirements of power, voltage, climatic conditions, etc.

My present invention is an improvement in stations of the aforesaid type. The general results which my invention secures are, briefly stated, decrease in initial cost, greater ease and less expense in manufacture, transportation and installation, simplification in structure and mode of operation, reduction in size and weight, the provision of safety for the operator in a novel and effective manner, the provision of a novel means for flashing or identifying and testing the attached cables and lines.

Another and highly important feature of my invention is the flexibility of design which permits circuit breakers of different manufacture or of different design to be employed optionally without difficulty and with substantially no change in the station even though the same be completely constructed.

The station of my invention is economical of materials and of space. By my construction, the height is very considerably reduced and the greatest width likewise is reduced over known designs. A bay or unit may now be assembled complete, frame and all, the bus and boxes filled with oil, all ready to set up and be joined to adjacent bays. The circuit breakers are preferably shipped separately, but that is not necessary. The unit with frame is small enough to permit it to be shipped on a flat car. This reduces costs greatly.

A feature in the reduction of height, and also width, is the manner in which the supporting frame and the circuit breakers are assembled. Prior designs require the circuit breakers to be dropped or pulled out of a frame or box-like support. This calls for an increase in height, which is avoided in my design.

The disconnects of my present invention are novel and highly useful in this and other relations.

The framing for forming the support of the mechanism is novel and presents a distinct improvement. The station lends itself to a single or double bus design without difficulty.

There are other and incidental elements of novelty which will become more apparent from the following detailed description and claims:

Now in order to acquaint those skilled in the art with the manner of constructing and operating the device embodying my invention, I shall describe in connection with the accompanying drawings a specific embodiment of the same.

Throughout the drawings, like reference numerals are employed to designate like parts.

In the drawings:—

Fig. 5 is a longitudinal vertical section taken on the line 5—5 of Fig. 1;

Fig. 6 is an enlarged vertical transverse section through the disconnecting switch;

Fig. 7 is a horizontal section taken on the line 7—7 of Fig. 6;

Fig. 9 is a fragmentary plan view of a detail showing one bus used as a transfer bus with the possibility of installing an oil switch at any time;

Fig. 10 is a vertical transverse section through a modified form of station employing a single main bus and a transfer bus;

Fig. 11 is a diagram of connections of the station shown in Fig. 10.

Fig. 12 is a top plan view of the station which is shown in section in Fig. 10.

In the following detailed specification, like reference numerals refer to like parts throughout.

The preferred embodiment is shown in Figures 1 to 8, inclusive, as constituting a two bus station. That is to say, there are two sets of conductors serving as buses normally connected to a source of power and each normally connected to an outgoing line through suitable mechanism, permitting the lines to be automatically opened in case of trouble and also to be switched from one bus to another.

In Figure 10 is shown a station in which a single main bus with a reserve bus is employed.

Figure 8:
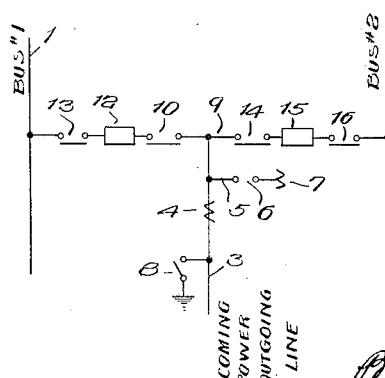
Fig. 8 is a diagram of connections.

Referring first to the wiring diagram of Figure 8, which is a single line diagram, the main buses are shown at 1 and 2 and they consist of longitudinal conductors extending lengthwise of the station, as will be more fully described later. These buses are connected to incoming power conductors or outgoing line conductors such as the conductor 3, shown at the middle of Figure 8. The current transformer 4, which is of the removable type, is connected in series in the conductor 3. A transverse tap 5 leads through a potential transformer fuse 6 to the winding of the potential transformer 7. The conductor 3 preferably enters the station frame as an underground cable and at the point where the cable opens into the metallic enclosure for the overhead conductors a grounding bridge 8 is provided. The cable may enter as a single phase cable or it may enter as a three phase cable with three conductors which are fanned out in a terminal box or the like.

The conductor 3 is connected to a horizontal transverse conductor 9 which extends through disconnecting switch 10, circuit breaker 12 and disconnect switch 13 to the phase conductor of bus 1. Likewise, the transverse conductor 9 is connected through a similar connection to bus 2 involving a disconnect switch 14, circuit breaker 15 and disconnect 16.

It can be seen that by this arrangement a line may be connected to either bus 1 or bus 2 and that switching of such connection may be made under load; also that due to the disconnects on either side of the oil circuit breakers 12 and 15 the oil circuit breakers may be disconnected and removed and/or replaced. Suitable metering and regulating equipment may be employed in conjunction with the station, but that has not been shown. Reactors may be included in the lines, these preferably being disposed on the ground alongside the main parts of the station, or they may be otherwise disposed.

The disconnects to which I have previously referred and their particular construction are, for certain features of the present invention, highly important and permit certain other constructions which have not heretofore been attainable in stations of this class. This will be stated more in detail later.

Figure 3:
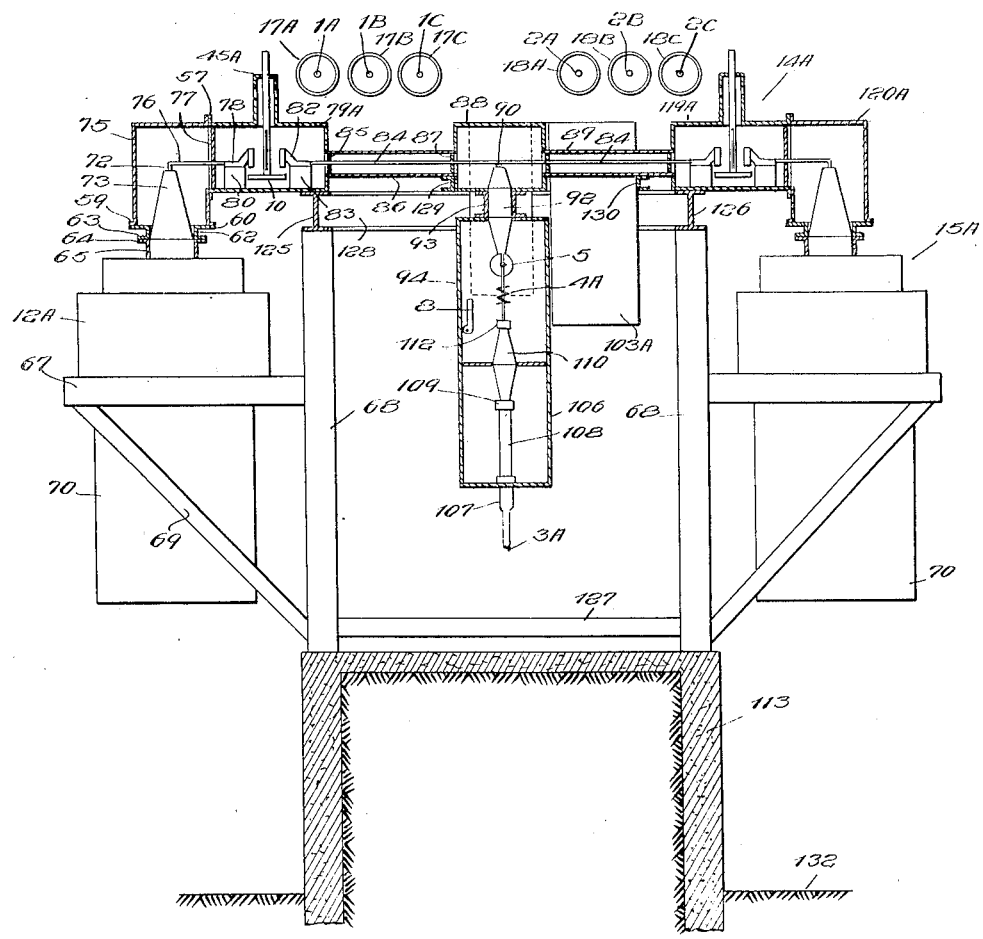
Fig. 3 is a vertical transverse section taken on the line 3—3 of Fig. 1.

The phase conductors of the busses are shown in transverse section in Figure 3, bus 1 has the phase conductors 1A, 1B and 1C. Likewise, the other bus, namely, 2, has the phase conductors 2A, 2B and 2C arranged in like order. These bus conductors are disposed in tubular metallic sheathing such as the tubes 17A and 18A for housing the conductors 1A and 2A, respectively. The tubular sheaths for the various conductors of each bus are substantially identical except as they are modified by the location of the connecting boxes through which connection to the circuit breaker is or may be made. As shown in plan in Figure 1, the junction boxes 19A, 19B and 19C are staggered in the sheath of bus 1 and, likewise, junction boxes 20A, 20B and 20C are staggered in the sheath of bus 2.

The tubular metal sheaths, such as 17 and 18, are preferably thin copper pipes or the like, and the boxes, such as 19 and 20, are preferably thin cast iron boxes. They may be made of any form of sheet metal or of cast metal such as bronze, aluminum, non-magnetic iron, or any other suitable medium, preferably of a non-magnetic character. The copper tubing or the like, such as 17 and 18, is fastened into openings in the side walls of the boxes in a manner to make a fluid tight joint tight enough to retain the included insulating material which is preferably a thin oil about the equivalent of a light machine oil or perhaps as thin as kerosene, such as the oil employed in transformers.

The boxes 19A, 19B and 19C provide connections which extend through the oil circuit breakers 12A, 12B and 12C to the line conductors 3A, 3B and 3C.

An operating mechanism 22 for the three oil circuit breakers 12A, 12B and 12C is provided for operating the same in unison.

Figure 4:
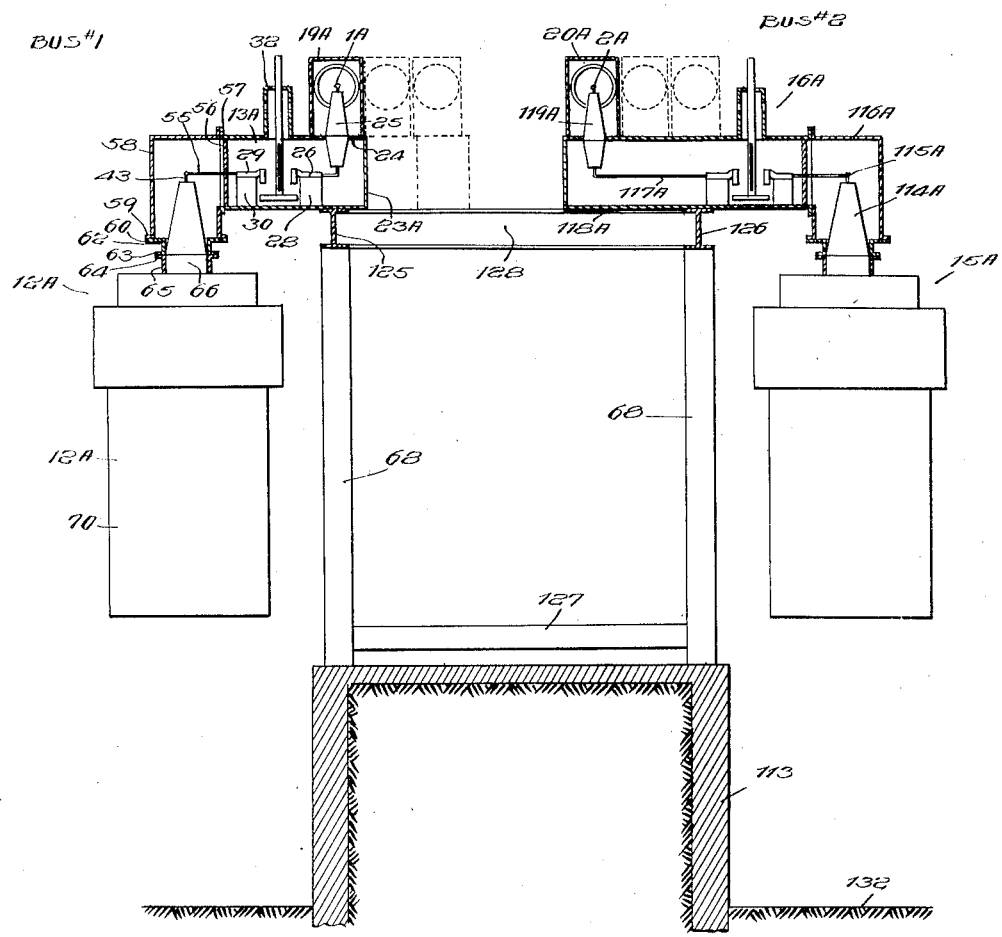
Fig. 4 is a similar transverse section taken on the line 4—4 of Fig. 1.

Referring now to Figure 4, wherein there is shown a section through the junction box 19A for bus 1 and through junction box 20A for bus 2, it will be seen that the box 19A rests upon a similar box or casing 23A, there being a metallic wall 24 common to the two boxes and a bushing type insulator extending through the wall and providing insulation for the tap which extends from the conductor 1A through the bushing to the stationary terminal 26 of the disconnect switch 27A, which is disposed within the housing 23A. The terminal 26 is mounted upon a block 28 of insulation and a similar terminal 29 is likewise mounted upon a block 30 of insulation within the casing 23, these insulating blocks preferably being supported upon the bottom wall of the casing 23A. The casing 23A has an upwardly projecting extension 32, more clearly shown in Figure 6.

The extension 32 has the full width of the casing 23A and forms a continuation of the said casing to provide a housing for the barrier 33 which is carried by the disconnect switch operating rod 34.

The rod 34 carries at its lower end a switch link or bar 35 carrying contacts 36 and 37 at its end adapted to cooperate with the spring contact fingers 38 and 39 mounted upon the terminals 29 and 26, respectively. The switch bar 35 is a conducting link which is removable from the contacts 38 and 39 to physically and electrically interrupt the continuity of the conductor 40 which is connected to the phase conductor 1A and the conductor 42 which is connected to the terminal 43 of the oil switch 12.

The insulators 28 and 30 may be the usual post type insulators mounted in any suitable manner upon the bottom wall of the casing 23A, and the disconnect switch bar 35 is adapted to be thrust downwardly into the position shown in Figures 4 and 6 to disconnect the terminal 43 of the corresponding oil circuit breaker 12A.

As previously remarked, the three phases are substantially symmetrical for both bus 1 and bus 2. The disconnects for both sides of the oil circuit breaker are alike for each circuit breaker of the group for each bus. The addition of the indications A, B or C to a reference numeral herein indicates that the part is for phase A, phase B and phase C, respectively; otherwise, the parts are substantially identical.

The barrier 33 comprises a metallic plate 46 completely covered with insulation except at its edges, by an envelope 47 of insulation, and this metal plate 46 is guided in suitable guideways 48 and 49 formed at the sides of the casing. This is shown more clearly in Figure 7. This barrier plate 46 is intended to interpose between the disconnect terminals 26 and 29 a grounded metallic barrier for insuring workmen against injury during any work upon the oil circuit breakers or in connecting or disconnecting them. It is a familiar requirement that a workman or operator shall not do any work upon the oil switches or any of the high tension conductors unless the disconnect switches are open. In fact, many workmen insist upon seeing that the switch is open before undertaking any work on the parts which otherwise would be live, because of the danger to life which is involved. In the present construction the disconnects are interlocked with the circuit breakers so that the disconnects cannot be opened or closed when the corresponding circuit breakers are in closed position.

The lowering of the disconnect bar 35 is accompanied by the interposition of the barrier 33 between the terminals 38 and 39, or the like, and this barrier is grounded through the casing and through the guideways, such as 48 and 49. In fact, the metallic plate 46 may be connected by a flexible lead to the grounded casing so as to insure not only that the disconnect switch is open, but also that a grounded barrier is interposed between the live part and the parts which are intended to be rendered dead by the opening of the disconnect.

The barrier 33 is adapted to enter the housing 32 when the disconnect is closed. The housing 32 has a tight cover 48 through which the rod 34 passes, a suitable packing gland 49 being provided to maintain a tight joint. Sight openings 50—52 are provided upon opposite sides of the casing 32 and these sight openings are covered by glass windows 53 held in place by clamping rings 54 with suitable interposed gaskets to seal the sight openings but to provide clear vision through the windows in line with the barrier 33. The barrier 33 performs the dual function of providing an indicator. That is to say, when the barrier 33 is lowered, the operator or attendant can look through the two windows and see that the disconnect switch is open. If the oil is relatively discolored or otherwise not clear, an electric light may be placed upon one side to determine whether or not the barrier 33 is out of the way. If the barrier is in the way, no light can shine through and the attendant therefore knows that the oil circuit breaker is not disconnected. If the light shines through, the barrier is out of the way and the disconnect switch is open so that the oil circuit breaker is disconnected.

The oil switch, such as 12A, is permanently connected in place, as will be apparent from Figures 3 and 4. Referring to Figure 4, the terminal 39 of the disconnect switch 13A has a conductor 55 extending through the oil seal barrier or wall 56 and connects to the circuit breaker terminal 43.

The casing 23A has a flange at 57 to which the oil circuit breaker terminal box 58 is adapted to be clamped by a cooperating flange. This box 58 is generally rectangular, although the form of the same is optional. At its bottom it has a clamping flange 59 to which a flange 60 of a suitable collar 62 is clamped. Suitable cap screws or the like are employed for joining the flanges 59 and 60. The bottom of the collar 62 likewise has a clamping flange 63 which is coupled to the flange 64 forming a part of the circuit breaker frame. The flange 64 is formed on a sleeve 65, the lower end of the sleeve forming a part of the top frame of the circuit breaker.

The collar 65 surrounds the terminal bushing 66 of the circuit breaker, this terminal bushing 66 being a permanent part of the circuit breaker structure. The bushing 66 extends upwardly in the box 58 and supports the terminal 43, which is a permanent part of the circuit breaker, and to the terminal 43 the conductor 55 above referred to is connected.

The circuit breaker 12A has, of course, the two terminals, as is well known to those skilled in the art, mounted upon the top frame of the same. The circuit breaker is supported upon the main frame in a manner to be described later. Suffice it to say here that the circuit breakers are mounted on horizontally extending beams, such as 67, which extend out from the vertical frame members 68, being supported at their outer ends by the diagonal struts such as 69 so that the three circuit breakers 12A, 12B and 12C may be removed individually or as a unit by being moved horizontally to the left as viewed in Figure 3. For such removal it is necessary to uncouple the flanges such as form the joint between the terminal box 58 and the disconnect switch box 23A.

The oil barrier 56 is disposed within the end of the box 23A and it serves to prevent the escape of oil, as all of these metallic casings which contain live parts are filled with oil.

Oil barriers are preferably formed throughout the sheathing wherever it is desired to provide parts which can be coupled or uncoupled. Also, the barriers for oil are interposed to prevent leakage from one part from draining another part.

It is to be understood that these various boxes, such as 19A, 23A and 58A and the like, have suitable openings covered by cover plates or the like for convenience of access to the interior thereof. This is a feature which I have not shown in detail, as it is well known in the art and specific novelty therein is not claimed.

It will be observed that when the oil circuit breakers are to be removed, the flanges, such as 57, must be released and the conductor 55 uncoupled from the terminal, such as 43, whereupon the oil circuit breakers can be moved out horizontally for replacement, repair or the like.

This is a highly important feature of my invention, namely, that the oil circuit breakers are permanently fixed in position and are not raised and lowered for purposes of disconnecting as in prior forms of devices. The disconnects, such as 13, are under oil and are contained within the casing. One of the difficulties of constructing a station is, of course, the arrangement of the disconnect, because it is desirable to have the disconnects so arranged that an attendant can positively assure himself that the circuit breakers or the like are completely disconnected from any possibility of potential. It is quite rare that oil circuit breakers require to be removed from the the switching structure, as by lowering the oil pots, such as 70, from the circuit breaker frame the circuit breaker contacts are revealed and may readily be serviced, repaired or replaced without the necessity for removing the circuit breaker itself from the structure. The form of station which I have shown is peculiarly advantageous for this purpose in that the circuit breakers are upon the outside of the main frame and are in position to be freely accessible for such service and repair work. If it is necessary to remove the circuit breakers, they may be lowered onto a motor truck or the like and hauled away.

By the construction of having the bushing itself, or the collar 65 thereof, coupled directly to the box, such as 58, by interchangeable collars such as 62, any form of switch or circuit breaker may be employed in the station, even though the station is designed initially for one particular circuit breaker. That is to say, if the attendant wishes to substitute a different form of circuit breaker,—that is, one made by another manufacturer,—it is not necessary to redesign the station to accomplish this. Likewise, if an extension of the station is to be made, circuit breakers of any design may be employed and suitably coupled up as shown, as a variety of sizes, spacings, etc., may be taken care of by the collar 62 and the box 58 without other changes in the permanent parts of the station.

This also reduces very materially the width of the station and permits of a very compact arrangement.

Figure 1:
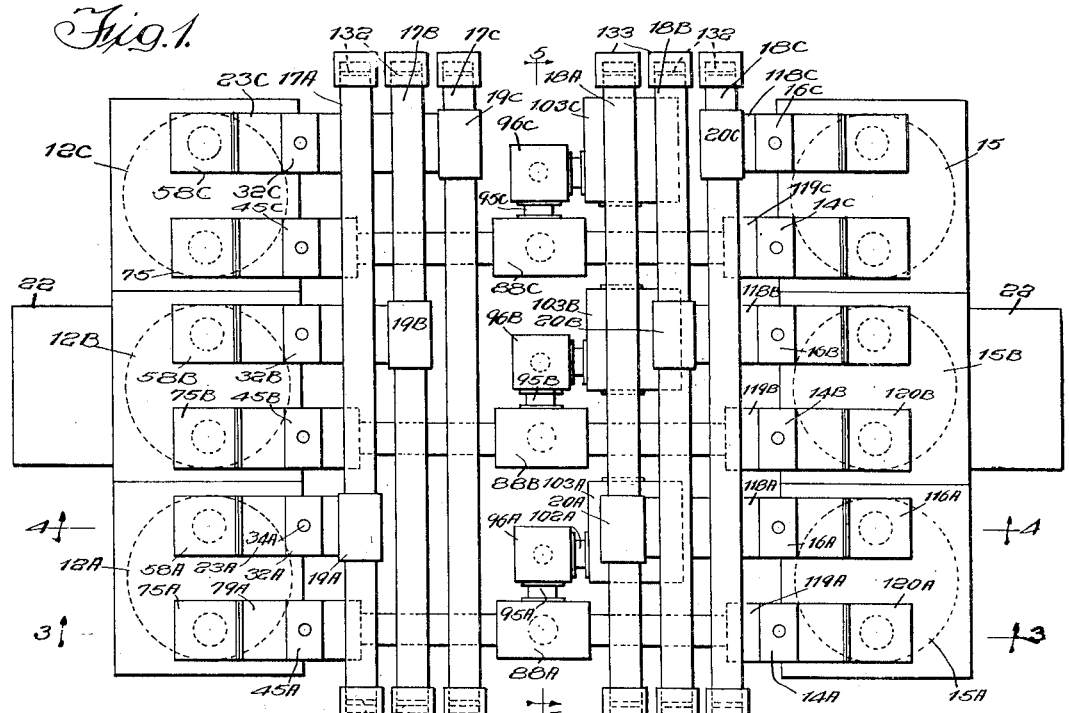
Fig. 1 is a top plan view of one bay of a station embodying my invention.
Figure 2:
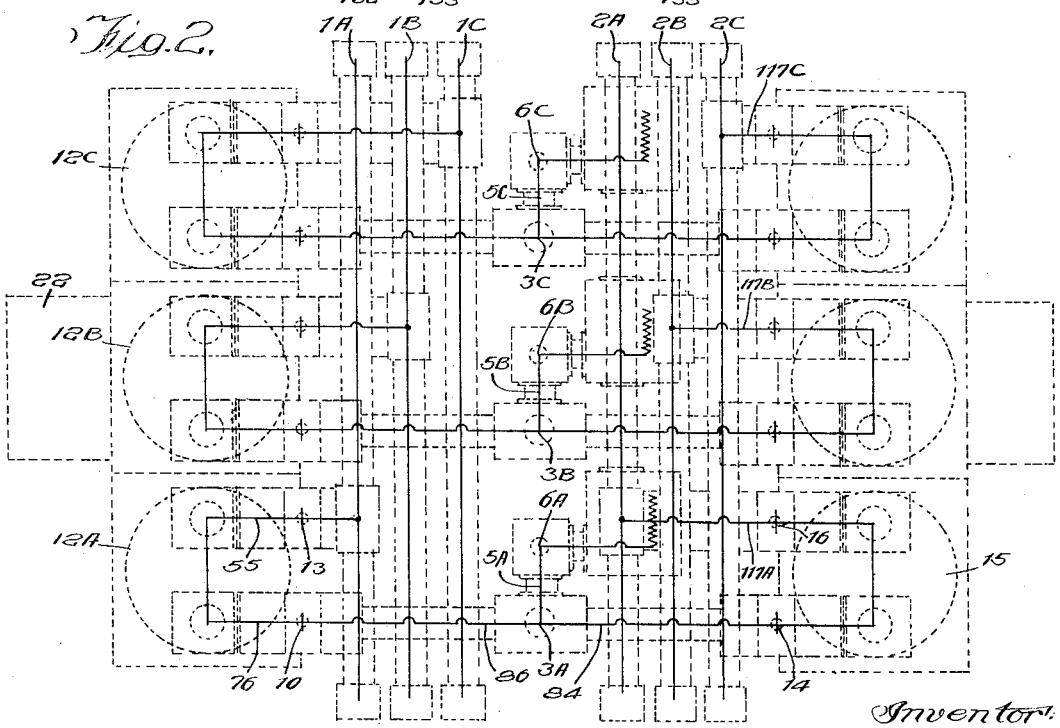
Fig. 2 is a view similar to Fig. 1 showing, in plan, the connections of the various phase conductors.

The compactness may be illustrated by the fact that a complete bay, such as that shown in plan in Figure 1, including the framework, may be shipped, assembled, on a flat car.

A further discussion of this detail appears later.

The opposite pole of the oil circuit breaker 12A is shown in the cross section of Figure 3. The terminal 72 is in all respects like the terminal 43 and it is mounted upon a bushing which is like the bushing 66. A suitable collar 65, identical with that one shown in Figure 4, having the flange 64, is coupled to the collar 62 having the cooperating flange 63, and the collar 62 has a flange 60 coupled to the flange 59 on the terminal box 75.

The conductor 76 extends through the oil barrier 77 to the terminal 78, which is mounted within the disconnect switch housing 79 upon a post insulator 80. The disconnect switch 10 is in all respects like the disconnect switch 13 shown in Fig. 4. The opposite terminal 82 is mounted upon a post insulator 83 and a conductor 84 extends through an opening in the end wall of the casing 79 through an oil barrier 85, through the tube 86 to a second oil barrier 87 at the end of the tube 86, and into the box or casing 88 which forms the junction between the line conductor, such as 3A, and the transverse conductor 84, which is shown in Figure 3, and corresponding conductor on diagram of Figure 8 is shown at 9.

The opposite side of the junction box 88 has a sheath in the form of tube 89 extending therefrom for enclosing the right hand extension of the conductor 84 where the same leads to the disconnect switch 14 for the oil circuit breaker 15. The disconnect switch 16 is mounted directly back of the disconnect switch 14 in the diagram of Figure 3, as may be seen from the plan view of Figure 1.

The disconnect switch 14A indicated in Figure 3 is in all respects like the disconnect switch heretofore described in detail in connection with the showing of Figures 4, 6 and 7.

No specific description of the disconnects 14A and 15A and of the oil circuit breaker 13A is required, as it is believed that the same will be fully understood from the foregoing discussion.

The conductor 84 is connected to the incoming line conductor 3A at 90 where the incoming line conductor 3A passes through the insulating bushing 92. The bottom of the junction box 88 has a short flanged nipple 93 bolted thereto with the upper end of the bushing 92 projecting into the casing 88. The other end of the flanged nipple 93 is bolted to the top of the current transformer casing 94 and the lower end of the bushing 92 projects thereinto. The current transformer 4 is of the removable type, that is, it has a main conductor, the ends of which may be clamped to the adjacent conducting part so that the entire transformer may be readily removed. The connection 5 indicated on the diagram of Fig. 8 will be found as leading off from the conductor 3A just below the bushing 92, and this conductor 5 extends through a suitable bushing 95 which is mounted in a flanged nipple between the current transformer casing or box 94 and the fuse box or casing 96.

A suitable mounting terminal 97 for a high tension fuse 98 is mounted upon the end of the bushing 95.

A similar insulating bushing 99 forms a suitable terminal 100 for the upper end of the fuse 98.

The bushing 99 is mounted in a flanged nipple which extends between the fuse casing 96 and the potential transformer housing 103A, this nipple being shown in plan view in Figure 1.

The three sets of transformer boxes 103A, 103B and 103C are coupled together by the flanged tubes 104 and 105, as shown in Figure 5. These flanged tubes are located directly under the bus sheath 18A in Figure 1.

The cases 103 covering the potential transformers cannot be removed unless the ground switches 8 are closed. Also, the ground switches cannot be opened unless the corresponding potential transformer is back in place. A suitable interlock for this purpose is provided.

Below the current transformer housing 94 is a terminal box 106. The conductor 3 for each phase enters, in the construction here shown, as single phase cable with a single conductor which terminates in a seal at 107 and having a removable link bolted at each end. This link conductor is indicated at 108. This link connects to the cable conductor at its lower end and at its upper end connects to a terminal 109 mounted upon the lower end of the insulating bushing 110 which extends through the wall dividing the cable terminal box 106 from the current transformer box 94.

A grounding switch 8, operable from the exterior, is adapted to ground the line terminal 112 within the box 94. The box 106 is preferably filled with liquid insulation, such as oil, although it may be filled with a solid compound. A single box for all three phases may be employed where the line enters as a three phase cable. If single phase cable is used and the box 106 filled with oil, the ground switch may be disposed in said box 106, to ground terminal 109.

Now, assuming that the line connected to the particular bay shown in Figure 1 is connected to a line leading to a point of consumption, the cables 3A, 3B and 3C, which in this instance are single conductor single phase cables, extend down through the raised foundation 113 and thence upwardly through reactors or induction regulators, if the same are to be employed, to either an overhead transmission line or an underground cabled transmission line. This line comprising the conductors 3A, 3B and 3C can be supplied with power from either bus 1 or bus 2, as will be apparent from the following route of connection. The incoming cable, such as 3A, is connected through the removable link 108, the removable current transformer link 4A, thence through the bushing 92 to the transverse bus conductor 84 which extends to the left through disconnect switch 10, shown at the left of Figure 3, then through conductor 76 to the terminal 72 of the oil circuit breaker 12A, thence through the oil circuit breaker 12A to the other terminal 43 thereof, as shown in Figure 4, thence through disconnect switch 13A and, by way of the conductor extending through bushing 25, to the bus phase conductor 1A.

Now it will be observed that the bus conductors extend longitudinally of the particular bay shown in Figure 1, and these bus conductors of both bus 1 and of bus 2 are disposed above the other conductors and form, in fact, the highest part of the station. A number of bays, such as shown in Figure 1, are connected with the bus conductors, endwise in alignment, by suitable couplings of a type which is now known, or of any preferred type.

The bus conductors and their sheaths are grouped closely together, as will be apparent from Figures 1, 3 and 4, sufficient space being provided between buses 1 and 2 to provide suitable access to the casings 88 and 96. These casings have openings with removable closures (not shown for the sake of clearness) to permit access to the interior thereof.

By comparison of Figures 1, 3 and 4, it will be seen that the arrangement of connections is entirely symmetrical. The box 79A (see Figure 3) is relatively short. The box 23A may be of the same length as the box 79A. Whereas the box 79A has an opening in its left side for connection with the tubular sheath 86, the box 23A has an opening in the top for mounting the bushing 25 and it is coupled to the junction box 19A.

If desired, the boxes 23A and 79A may be made duplicates and provided with suitable openings which may optionally be opened or closed, depending upon the duty which they are to perform. Likewise, the connection to bus 2 consists of the run of conductor 84 extending to the right from the junction point 90 as shown in Figure 3, thence through the disconnect switch 14A which is contained in a housing substantially identical with the housing 79A, thence through a terminal box housing the terminal of the oil circuit breaker 15A as shown in Figure 3, thence through the oil circuit breaker 15A and, as shown in Figure 4, through bushing 114A, terminal 115A in terminal box 116A, thence through the disconnect switch 16A, conductor 117A, in the relatively long casing 118A, thence through the bushing 119A to the phase conductor 2A of bus 2 within the junction box 20A.

It will be observed that the casing 118A which contains the disconnect switch 16A is made longer in order to reach over to phase conductor 2A.

For line conductor 3B, the casing which houses conductor 117B (see diagram of Figure 2) extends only so far as bus conductor 2B, and, likewise, housing 118B which houses conductor 117B extends only so far as the phase conductor 2C.

The same arrangement of boxes prevails in respect to bus 1. The housings, such as 79A and 119A, which connect the incoming line conductor with the disconnect switch of each of the circuit breakers, are alike for both bus 1 and bus 2 for all three phases.

Therefore, only three forms of casings are required, assuming that the casing such as 79A is made the same as 23A. If these casings are different, then only four forms of such casings are required for making up the station. Obviously, these casings may be made up in sections so that the casing for the disconnect switch may in each case be the same and the casing for the oil circuit breaker may in each case be the same, so that with a view of interchangeable parts, the entire station may be made up.

These various casings for connecting the disconnects with either the bus or with the line conductors rest upon a steel framework comprising longitudinal sills 125 and 126 (see Figures 3 and 4), these sills or beams resting upon posts 68 preferably four in number and arranged adjacent the corner of the frame. At their lower ends the posts 68 may be connected by transverse frame members 127 and at their upper ends they are connected to the longitudinal beams or sills 125 and 126, and these beams or sills likewise are cross connected by transverse beams such as 128, shown in Figure 3. These cross beams 128 extend adjacent the casings 88 and 96 of each phase so as to support such casings 88, 96 and 103 for each phase. Instead of a single cross beam for each conductor, a pair of such beams may be provided if desired for the support of the aforesaid casings and connected parts. Supplementary longitudinal bars or beams 129 and 130 resting upon the transverse beams 128 serve further to support the aforesaid casing and connected parts and also to brace the frame structure.

In order to couple adjacent bays together, the beams 125 and 126 of adjacent sections are joined by suitable joining plates or bars, which may be bolted or riveted to the adjacent ends, thus connecting frames of adjacent bays together. The conductors of the buses are joined by clamp connections which include flexible couplings to take care of the endwise expansion of the copper of the bars, and the sheaths are joined by telescopic joints to provide for expansion and contraction in the sheaths and also to provide the required play to secure connection of these parts within the tolerances required for economical manufacture. It will be observed by considering Figure 1 that the bus sheaths of buses 1 and 2 provide ample room for slipping a sleeve over the tubing forming the sheath, inasmuch as there is a considerable distance from the junction boxes 19A and 20A to the ends of the tubes joined thereto and, hence, a joining sleeve may be slipped back over the tubing of each of the bus conductors, then the joint in the conductor made up and then the joining sleeve slipped over the gap between adjacent sheaths and the joint perfected.

The unit bay with framework is set up in the factory and filled with oil. The ends of the sheaths, such as 17 and 18, are provided with oil barriers as indicated in dotted lines at 132 in Figure 1, the ends of the conductors extending through said oil barriers and caps 133 closing the ends of the tubes. Hence, for making the coupling between adjacent bays, the bays are put in place, the caps being removed. The oil will not flow out of the sheaths because of the barriers which seal off the sheaths. The conductors extend beyond the barriers and adjacent ends of conductors may be joined and the coupling sleeves which are slipped over the ends of the sheaths 17 and 18 at the ends corresponding to the bottom of Figure 1 are then moved over the gaps in adjacent sheaths and sealed in place and filled with oil.

The frame shown in Figures 3 and 4 is reduced in height as the same is mounted upon an elevated foundation 113, but obviously the posts 68 may be increased in length so that the elevated foundation is not required. The total height of the station herein illustrated, measured from grade level 132, is slightly under thirteen feet. The total width of the station, including the circuit breakers but not including the operating mechanism 22—22, is likewise slightly under thirteen feet. The length of the bay overall, with taps on the ends of the bus conductor sheaths, is ten feet. This, therefore, readily permits the units to be shipped complete on a flat car.

The dimensions here above given apply to 33 KV. gear. If this gear is built for voltages below 33 KV. the dimensions will be less, and if the gear is for higher voltage the dimensions will also be increased. The gear is now being designed so that it may be built for all voltages.

The unit is provided with oil tanks, known in the art as oil conservators, for maintaining all of the parts full of oil. The tanks are disposed above the level of the buses so that all of the other parts are below the level of the buses and all of the parts are below the level of oil in the conservators. I have not shown the oil conservators and various tubes connecting the same with different parts of the sheathing. No voids are permitted to exist in this gear. All parts are filled with oil or equivalent liquid insulation which eliminates the possibility of condensation forming in dead air spaces.

The frame and sheathing are preferably bonded together and grounded, although it is contemplated that in order to avoid eddy currents or the building up of potentials the joining sleeves between various parts of the sheathing shall contain insulating joints. Also, various parts may be insulated from the frame in order to prevent such a current from flowing therethrough.

By opening the disconnects and inserting dummy connections instead of the potential transformer fuses 6A, 6B and 6C, the various line or cable conductors may be flashed out or tested. For this purpose the tops of the housings 96A, 96B and 96C are provided with removable covers to permit such dummy plugs to be inserted in the place of the fuses 6A, 6B and 6C.

Preferably, I provide interlocks between the disconnecting switches and the said fuses so that it is impossible to insert a testing plug instead of a fuse without having the disconnects open.

The disconnect switches are preferably gang operated so that all of the disconnects must be opened and potential cannot be placed upon any one part of the apparatus through return from a transformer or the like from the other phases.

The oil tanks of the circuit breakers are interlocked with the disconnects so that the tanks cannot be removed from the breakers unless the disconnects upon both sides of the breakers are open. This interlock also does not permit the closing of the disconnects unless the oil tanks are in normal operating position.

The station herein shown is readily adaptable to single bus construction. In that event the lines are connectible to the main bus corresponding to bus 1 through disconnects and oil circuit breakers, whereas they are connectible to the reserve or auxiliary bus corresponding to bus 2 only through disconnects. The structure shown in Figures 1 to 8 may be converted into a single bus system by omitting the oil circuit breakers and one disconnect in the manner shown in Figure 9 where the junction box 88C is connected through the sheath 133 with a box or casing 134 that takes the place of the terminal boxes 75B and 58B shown on Figure 1. This box or casing 134 carries a conductor which is then joined to the disconnect switch housing 23C, the disconnect switch 10 being omitted and the disconnect switch 13 being retained. The other two phases are similarly modified.

In Figure 10, I have shown a single bus design, the diagram of connections being shown in Figure 11. The incoming line 3, which may be in the form of three single phase conductor cables or a three-phase cable or the like, enters through a cable terminal 107, the bottom of the box 106, to the removable link 108. The grounding switch 112 is disposed in the casing 106 as previously described in connection with Figure 3. From thence the connection extends through the bushing 110 to the removable current transformer 4 in the casing 94, then through the bushing 92 to the junction point 90 in the casing 88. From this point the connections to the phase conductor disconnect switch 10, oil circuit breaker 12, disconnect switch 13, and to the corresponding bus phase conductor 135A is the same as described in connection with Figures 3 and 4.

The transfer bus is spaced away from the main bus and extends to the right of the frame through different lengths of disconnect switch housings 137 extending under the respective bus sheaths for the different phases. The disconnect switch 14 is disposed within the housing 137 and one terminal of the disconnect is connected to the junction point 90 and the other is connected to a conductor which leads through a bushing such as 138 to the corresponding junction box 139 leading to the sheath of the individual bus phase conductor. These disconnect switch housings 137 are mounted directly upon the horizontal longitudinal frame members 126.

The connection at 5 to the central transformer 7 through the transformer fuse 6 may be disposed in housings as disclosed in connection with the forms shown in Figures 1 to 8, inclusive. A resistance 139 is included in series with the fuse 6 as shown in the diagram of Figure 11, this being common practice, and a disconnect and grounding fuse 140 being provided for said resistance and fuse terminal. This disconnect and grounding switch 140 may be disposed in a housing similar to the housing 96 shown in Figure 5.

This form of station is equally compact and advantageous and it provides the necessary protective equipment together with the advantages of simplified construction heretofore recited in connection with the first embodiment.

The incoming power bay may be like the bay heretofore described in connection with each of the aforesaid embodiments. All live conductors are sheathed in grounded metallic casings which are filled with insulating oil or the equivalent. The reduction in size and weight over prior designs is apparent, and the ease of manufacture, transportation and installation is also apparent. The disconnects are preferably interlocked in each case with the oil circuit breakers so that the disconnects may not inadvertently be opened under load. The flexibility of design which permits circuit breakers of different manufacturers to be employed in the same station, or repairs or replacements to be made, is notable.

The disconnect switch of my invention is highly desirable in this connection since it has means for insuring that the act of disconnection has actually been completed and the use of this form of disconnect or an equivalent form, which provides the certainty of disconnection, permits the oil circuit breakers to be permanently connected to the terminals of the disconnect instead of being required to be lowered for the purpose of making disconnection. Also, this form of disconnect avoids the difficulties heretofore encountered in connection with pull-out or slip terminals on the main circuit breakers, in that no live parts are exposed to atmospheric conditions; also, the bushing insulators of the oil switches are not exposed to the deposit of dust, moisture and the like thereupon as in the case of previous designs. The bushings of my station are all submerger under oil at all times.

By thus disposing all insulators, bushings and live parts under oil, the possibility of depositing dirt, soot, etc. upon these parts is prevented. This also eliminates the possibility of the formation of chemicals such as acids or salts by leakage across the surface of insulations which ultimately result in breakdown.

While I have shown as the preferred manner of joining the circuit breakers to the busses, the boxes 75 directly enclosing the bushings 73 so that the breaker terminals are permanently connected to the disconnect and hence to the line and bus, respectively, and this is the preferred form of my invention, certain features of the invention are advantageous whether or not this construction be employed. That is to say, there is a peculiar advantage in the broad combination of frame, circuit breakers, transformers, conductors and the like because of the advantageous disposition of the parts. The disposition of the main elevated frame which supports the line junction box and the bus junction boxes at one level and the bracket at a lower level for supporting the circuit breakers at the sides of the posts, a line coming in at the center, is highly advantageous as providing a compact, inexpensive and highly desirable construction.

1. The station is peculiarly compact.

(A) By disposing the incoming and outgoing lines centrally I place the transformers and junction boxes for the individual lines in a peculiarly advantageous position. This can be seen from the fact that the line branches at the junction box 88 and runs on either side directly to the circuit breaker terminals, in this case through the disconnect. The conductors extending from the opposite poles of the circuit breakers need then only return towards the center far enough to connect with the bus conductors through the bus junction boxes. Hence, there is ample room at the center for the transformers, fuses and the like.

(B) The height of my station is less than that required for prior stations. The chief reason for this lies in the fact that the circuit breakers are not required to be dropped for the disconnect operation. But even if my arrangement be adopted for circuit breakers with the pull-out and drop type of disconnect terminal, the height may still be less than that required for stations of the prior art because the circuit breakers are taken outwardly at right angles to the longitudinal axis of the stations and do not need to pass under any frame members.

2. The station is peculiarly accessible.

As those skilled in the art well know, the circuit breakers are the parts of a station that require the most attention. They must be inspected, the contacts dressed up, etc. In the present arrangement the circuit breakers are outside, in the most readily accessible position. The simplest form of lift truck can serve all the circuit breakers and there is ample room, not only to drop the oil tanks and work on the contacts, but also to drop the entire breaker where it is necessary to take the same out of service.

3. The station is peculiarly inexpensive to construct, assemble and maintain.

Because of less material in both the frame and in the conductors the station, per unit of capacity, is of lower cost than devices of the prior art.

There is a very much shorter run of conductors in my station than in stations of the prior art. The type of apparatus employed is less expensive; for instance, the pull-out sockets of the prior art may be dispensed with in the preferred form of my invention, thereby considerably reducing the cost of the installation.

Due to the fact that the stations of the prior art enclose within their structures more space than is enclosed by my device, less real estate as well as less material is required.

There are numerous advantages to which no specific reference has been made which will occur to those skilled in the art.

I do not intend to be limited to the details shown or described, and consider that the herein disclosed novel constructions and combinations of elements are entitled to the full range of equivalents permissible by the prior art.

I claim:—

1. In a bus and switch station, an elevated frame having supporting means, a sheathed bus disposed longitudinally of and supported upon said frame, a circuit breaker disposed at one side of the frame outside of the supporting means, and carried by said supporting means, a line extending substantially vertically from under said supporting means, a transverse sheathed conductor supported upon said frame under the bus, said transverse conductor connecting said line and one pole of said circuit breaker, and a second transverse sheathed conductor connecting the other pole of the circuit breaker and the bus.

2. In a bus and switch station, the combination of an elevated frame having longitudinally extending beams, posts disposed in longitudinal rows under said beams, a sheathed bus disposed upon said frame and extending longitudinally thereof, a circuit breaker supported at one side of said frame outside of said posts, a sheathed line extending up between the rows of posts, a transverse sheathed conductor disposed below the bus and connecting the line and one pole of the circuit breaker, and a second transverse sheathed conductor joining the other pole of the circuit breaker and the bus.

3. In a bus and switch station, the combination of an elevated frame having longitudinally extending beams, posts disposed in longitudinal rows under said beams, a sheathed bus disposed upon said frame and extending longitudinally thereof, a circuit breaker supported at one side of said frame outside of said rows of posts, a sheathed line extending up between the rows of posts, a transverse sheathed conductor, disposed below the bus and connecting the line and one pole of the circuit breaker, a second transverse sheathed conductor joining the other pole of the circuit breaker and the bus, and enclosed disconnects for disconnecting the circuit breakers connected in each of the transverse conductors.

4. A structure of the class described comprising in combination, an elevated frame, supporting means for the frame, a sheathed bus extending longitudinally of the frame, a circuit breaker disposed at one side of the frame outside the supporting means and having external terminals disposed at approximately the level of the frame, a transverse sheathed conductor permanently connected to one of said terminals and to said bus, a line extending from below to approximately the level of the frame, and a second transverse sheathed conductor connecting the other terminal of the circuit breaker and the line.

5. A structure of the class described comprising in combination, an elevated frame, supporting means for the frame, a sheathed bus extending longitudinally of the frame, a circuit breaker disposed at one side of the frame outside the supporting means and having external terminals disposed at approximately the level of the frame, a transverse sheathed conductor permanently connected to one of said terminals and to said bus, a line extending from below to approximately the level of the frame, a second transverse sheathed conductor connecting the other terminal of the circuit breaker and the line, and enclosed disconnect switches disposed in said transverse sheathed conductors.

6. In combination, a circuit breaker having a frame and insulating bushings carrying terminals, junction boxes enclosing said bushings there being a filling of liquid insulation in said boxes submerging said bushings, disconnect switches having boxes connected to the first junction boxes, a bus junction box connected to one of the disconnect switch boxes, a bus sheath connected to each side of the said one bus junction box, a bus conductor extending through the bus sheath, conductors connecting the circuit breaker terminals with the disconnects, a conductor connecting the said one of said disconnects with the bus conductor, and a sheathed line conductor connected to the said other disconnect.

7. In combination, a circuit breaker having a frame and insulating bushings carrying terminals, junction boxes enclosing said bushings there being a filling of liquid insulation in the said boxes submerging said bushings, disconnect switches having boxes connected to the first junction boxes, a bus junction box connected to one of the disconnect switch boxes, a bus sheath connected to each side of the said one bus junction box, a bus conductor extending through the bus sheath, conductors connecting the circuit breaker terminals with the disconnects, a conductor connecting the said one of said disconnects with the bus conductor, and a sheathed line conductor connected to the said other disconnect.

8. In combination, a circuit breaker having a frame and insulating bushings carrying terminals, junction boxes enclosing said bushings there being a filling of liquid insulation in the said boxes submerging said bushings, disconnect switches having boxes connected to the first junction boxes, a bus junction box connected to one of the disconnect switch boxes, a bus sheath connected to each side of the said one bus junction box, a bus conductor extending through the bus sheath, conductors connecting the circuit breaker terminals with the disconnects, a conductor connecting the said one of said disconnects with the bus conductor, and a sheathed line conductor connected to the said other disconnect, said disconnects having means for interposing a grounded barrier between the terminals thereof.

9. In combination, a circuit breaker having a frame and insulating bushings carrying terminals, junction boxes enclosing said bushings there being a filling of liquid insulation in the said boxes submerging said bushings, disconnect switches having boxes connected to the first junction boxes, a bus junction box connected to one of the disconnect switch boxes, a bus sheath connected to each side of the said one bus junction box, a bus conductor extending through the bus sheath, conductors connecting the circuit breaker terminals with the disconnects, a conductor connecting the said one of said disconnects with the bus conductor, and a sheathed line conductor connected to the said other disconnect, and means for grounding the circuit breaker terminals when the disconnect switches are opened.

10. In combination, a circuit breaker having a vertically extending bushing supporting a terminal, a sheathed liquid insulated bus extending horizontally and having a bus conductor, a box enclosing the terminal there being a filling of liquid insulation in the said boxes submerging said bushings, said box having a lateral opening, a disconnect switch having a housing with a lateral opening registering with the opening in said terminal enclosing box and having a vertically disposed opening, a junction box for the bus sheath having a vertical opening registering with the vertical opening in the switch housing, and conductors extending through said openings and connecting the circuit breaker terminal and the disconnect switch and connecting the disconnect switch and the bus conductor.

11. In combination, a circuit breaker having a vertically extending bushing supporting a terminal, a sheathed liquid insulated bus extending horizontally and having a bus conductor, a box enclosing the terminal there being a filling of liquid insulation in the said boxes submerging said bushings, said box having a lateral opening, a disconnect switch having a housing with a lateral opening registering with the opening in said terminal enclosing box and having a vertically disposed opening, a junction box for the bus sheath having a vertical opening registering with the vertical opening in the switch housing, and conductors extending through said openings and connecting the circuit breaker terminal and the disconnect switch and connecting the disconnect switch and the bus conductor, and means in the switch housing for protecting the circuit breaker terminal from the potential of the bus when the switch is in disconnect position.

12. In combination, a framework supported upon the ground and comprising vertical posts, a bus comprising conductors individually sheathed in liquid filled grounded sheaths extending longitudinally of the station above said frame, an incoming line conductor extending vertically on one side of certain of said posts, a transverse conductor above the frame and below the bus conductors connected to the line, a circuit breaker supported on the frame on the side of said last named posts opposite to that of the line, said circuit breaker having insulated terminals, said transverse conductor being permanently connected to one of said terminals, a disconnect switch serially included in said conductor, the said conductor, disconnect switch and circuit breaker terminal having a grounded liquid filled metal sheath covering the live parts of the same, a second horizontal conductor joined at one end to the other circuit breaker terminal and having a vertical connection to a bus phase conductor, and a disconnect switch serially included in said latter horizontal conductor, said latter horizontal conductor, said latter disconnect switch and said latter circuit breaker terminal being enclosed in a grounded liquid filled sheathing which is joined to the sheathing of the connected bus phase conductor.

13. In a station, a unit bay comprising a generally rectangular framework having posts supporting the same, said framework comprising longitudinal sills and transverse frame members, an incoming line conductor disposed vertically within the posts and extending upwardly towards the frame, a junction box supported on said frame, an insulating bushing projecting through the bottom of the junction box, the line conductor extending through said bushing, a horizontal conductor extending from said bushing, a disconnect switch having a housing mounted upon said frame, said switch having one terminal connected to said horizontal conductor, a metal sheath enclosing said conductor between the disconnect switch housing and the said junction box, a terminal box connected to the disconnect switch housing, a circuit breaker supported at the side of said frame having a terminal entering said terminal box, a second terminal box for the other terminal of said oil circuit breaker, a second disconnect switch having a metal housing joined to the terminal box, a longitudinal bus conductor having a metallic sheath disposed above the frame, a sheath for said bus conductor, and a junction box in said sheath, said junction box being connected to the last named disconnect switch housing, and a conductor joining the bus conductor to the one terminal of the last named disconnect switch, the other terminal of the last named disconnect switch being joined to the second circuit breaker terminal.

14. In a device of the class described, an elevated framework having longitudinal beams and transverse beams, a junction box disposed on said transverse beams, disconnect switch housings mounted on the longitudinal beams, circuit breakers mounted at the side and below said elevated frame and having terminals extending to substantially the level of the junction box and the disconnect switch housings, metallic enclosures for the circuit breaker terminals joined to the disconnect switch housings, conductors connecting the circuit breaker terminals to the terminals of the disconnect switches, longitudinally extending buses having metallic sheaths, junction boxes in said sheaths supported upon the disconnect switch housings, and a conductor from the bus extending to one of the disconnect switch terminals for each phase, and an incoming line entering the first named junction box.

15. In combination with an elevated frame having vertical supports, a junction box mounted upon said frame along substantially the median line of the same, a current transformer box below said junction box, an incoming line conductor entering said current transformer box, a current transformer in said box, an insulating bushing extending from the current transformer box into the junction box and the line conductor extending through said bushing, a potential transformer fuse box adjacent the current transformer box, an insulating bushing extending from the current transformer box into the potential transformer fuse box, a fuse in said fuse box, a potential transformer housing adjacent the fuse box, a bushing extending from the fuse box into the potential transformer housing, and a conductor extending through said bushing and being connected to said fuse, a longitudinally disposed bus above the framework, pairs of disconnect switch housings mounted upon the framework, junction boxes for the main bus mounted upon one of each of said pairs of disconnect switch housings, circuit breakers having pairs of terminals and metallic housings enclosing said terminals and being joined to the disconnect switch housings, conductors from the circuit breaker terminals to adjacent terminals of the disconnect switches, and conductors from the opposite terminals of the disconnect switches to the bus conductors and to the line conductor, respectively.

16. In combination with an elevated frame, a disconnect switch having a housing mounted upon said frame, a circuit breaker mounted upon the side of the frame and disposed below the disconnect switch, said circuit breaker having a pair of fixed terminals, a metallic enclosure for each terminal, said enclosures being joined to the disconnect switch housings and permanently connected thereto, conductors joining the adjacent terminals of the disconnect switches with the terminals of the circuit breaker, a main bus conductor joined to one of the disconnect switch terminals, and a line conductor joined to the other of said disconnect switch terminals.

17. In a system of the class described, a unit bay comprising a framework having supporting posts, longitudinally extending bus conductors having metallic enclosing sheaths, said sheaths being provided with oil barriers at the ends and being capped to close the ends of the sheaths, junction boxes in said sheaths, circuit breaker terminals permanently mounted upon the frame, housings for said terminals, disconnect switches having housings joined to the housings for the circuit breaker terminals, junction boxes in the sheaths of the bus phase conductors being mounted upon certain ones of the disconnect switch housings, and an incoming line conductor for each phase having a junction box coupled with one of the disconnect switch housings of each phase, said structure comprising a unitary article of manufacture having, when placed in operation, the various housings and sheaths thereof filled with liquid insulation.

18. A bay of a switch structure comprising the combination of a supporting frame having a top and sides, a line junction box mounted on the top part of the frame, pairs of disconnect switches having housings mounted on the top part of the frame, longitudinally extending bus conductors having metallic sheaths, bus junction boxes in the bush sheaths connected to the disconnect switch housings, insulating bushings extending between the bus junction boxes and the adjacent disconnect switch housings, a conductor extending through each bushing for joining the disconnecting switch to the bus phase conductor, circuit breakers mounted upon the sides of the housings and having terminals which are connected to the terminals of a pair of said disconnect switches, terminal housings for the terminals of the circuit breakers, said terminal housings being joined to the housings of the disconnect switches, and a sheathed conductor extending from the line junction box to the terminal of one of the disconnect switches of each pair, said sheaths, housings and boxes being filled with liquid insulation when placed in operation.

19. A bay of a switch station comprising the combination of a supporting frame having a top portion and side portions, line junction boxes mounted on the top portion of the frame, disconnecting switches having housings mounted on the top part of the frame, a line conductor entering each line junction box, longitudinally extending bus conductors having metallic sheaths, bus junction boxes in the bus sheaths connected to the disconnect switch housings, conductors extending from the bus phase conductors to a terminal of a disconnect switch for each phase, and a phase conductor extending from the line conductor in the line junction box to the opposite terminal of the disconnect switch for each phase, said sheaths, housings and boxes being filled with liquid insulation.

20. A bay of a switch station comprising a supporting frame having a top portion and side portions, a line junction box mounted on the top portion of the frame, a current transformer housing mounted below said line junction box, an insulating bushing extending from the housing into the box, a line conductor extending through said bushing, longitudinally extending bus conductors having metallic sheaths disposed above the top portion of the frame, bus junction boxes disposed in the bus sheaths, pairs of disconnect switches having housings mounted on the top part of the frame below the bus conductors, said disconnect switches having housings supporting the bus junction boxes, insulating bushings extending between the line phase conductors and the terminals of one of each pair of disconnect switches, each pair of disconnect switches having a terminal for connection to an oil circuit breaker, an oil circuit breaker for each phase mounted upon the side part of the frame and having bushings carrying terminals, conductors connecting said terminals to the last named terminals of the disconnect switches, housings enclosing the bushings and terminals of the circuit breakers, said housings being joined to the disconnect switch housings, and conductors for each phase for joining one of the circuit breaker terminals of each pair with the corresponding line conductor, and a sheath for said last named conductor joining the junction box with the disconnect switch housings, said sheaths, housings and boxes being filled with liquid insulation to enclose all of the live power carrying parts.

21. In a bus and switch station an elevated horizontally extending frame, vertically disposed supporting means for said frame, a sheathed bus disposed longitudinally of and supported on said frame, a circuit breaker support separate from the frame and being carried on the outside of said supporting means, a circuit breaker carried by said support, said breaker having terminals, a line comprising sheathed line conductors disposed vertically adjacent said supporting means, a transverse sheathed conductor disposed horizontally on said frame and connecting the upper end of a line conductor and one terminal of the circuit breaker, a second transverse sheathed conductor connecting another terminal of the circuit breaker and a conductor of the bus, said circuit breaker being supported with its terminals substantially at the level of the said transverse sheathed conductors.

22. In a bus and switch station an elevated horizontally extending frame, a row of posts supporting said frame, a bus comprising sheathed bus conductors disposed longitudinally of and supported on and above said frame, a circuit breaker support secured to said posts at one side thereof and being disposed below the frame, a circuit breaker carried by said support, said breaker having terminals, a line comprising sheathed line conductors extending upward on the side of said row of posts opposite said circuit breaker, a transverse sheathed conductor disposed horizontally on said frame and connecting the upper end of a line conductor with one terminal of the circuit breaker, a second transverse sheathed conductor connecting another terminal of the circuit breaker and a conductor of the bus, said circuit breaker being supported with its terminals substantially on the level of the said transverse sheathed conductors, said transverse sheathed conductors lying substantially in a common plane below the bus and above the said frame.

23. In a bus and switch station, a substantially rectangular elevated horizontal frame, a row of posts along each lateral edge of the frame, a pair of busses comprising sheathed conductors extending longitudinally of the frame and supported above the same, circuit breakers lying outside the two rows of posts and being supported with their terminals below the level of the bus, incoming lines extending vertically between the rows of posts, junction boxes for said lines, transverse conductors extending from each side of said junction boxes to corresponding terminals of the circuit breakers, and other transverse conductors extending from the opposite terminals of said circuit breakers to the said busses respectively.

24. In a bus and switch station a substantially rectangular elevated horizontal frame, a row of posts along each lateral edge of the frame, a bus comprising sheathed conductors extending longitudinally of the frame and supported above the same, circuit breakers lying outside the two rows of posts and having their terminals lying substantially below the level of the bus, incoming lines extending vertically between the rows of posts, junction boxes for said lines, transverse conductors extending from the junction boxes to the corresponding terminals of the circuit breakers, and other transverse conductors extending from the opposite terminals of said circuit breakers to said bus conductors.

25. In a bus and switch station, a longitudinally extending frame divided into bays, rows of posts at each side of the frame for supporting the frame in an elevated position, disconnect switches having housings mounted upon the side margins of the frame, a pair of busses disposed above said frame and overlying said disconnecting switch housings, circuit breakers having frames provided with bushings and terminals, said frames being supported at the sides of the posts and the terminals being disposed substantially on a level with the disconnect switch housings, metallic liquid containing housings enclosing the bushings and terminals of the circuit breakers and joining the disconnect switch housings, a line for each bay extending vertically between the rows of posts, horizontal transverse conductors connecting the lines to the disconnects on each side of the frame, and instrument transformers disposed between the posts and supported upon the frame below the busses.

26. In a bus and switch station, supporting means comprising a narrow, longitudinally extending, horizontally disposed frame, posts disposed in rows along the side margins of said frame, bracket frames extending laterally from the posts and lying below the first frame, circuit breakers supported on said brackets, said circuit breakers having bushings carrying terminals at approximately the level of the elevated frame but disposed outside thereof, boxes adapted to contain liquid insulation enclosing said bushings, lines disposed vertically between the posts, line junction boxes disposed upon the first frame, busses disposed on the first frame at a level above the line junction boxes, first transverse sheathed conductors joining the line junction boxes to certain ones of the circuit breaker terminals, second transverse sheathed conductors joining the bus conductors to certain others of the circuit breaker terminals, the sheaths of said conductors being joined to said boxes.

27. In combination, a circuit breaker, a power conductor, a run of sheath filled with insulating liquid and extending from the conductor to the breaker terminal and insulated from the conductor and the breaker terminal, a run of power leads housed within the sheath and insulated therefrom and connecting the power conductor with the breaker terminal, means within the sheath for interrupting the continuity of the power lead, and means for interrupting the continuity of the body of liquid within the sheath in the region of interruption of the continuity of the power lead, said last named means comprising a grounded barrier extending across the sheath and movable between the interrupted conductor ends.

28. In combination, a circuit breaker, a power conductor, a run of sheath filled with liquid insulation and extending from the power conductor to the breaker terminal and insulated from both the power conductor and the breaker terminal, a run of power leads housed within the sheath and insulated therefrom and connecting the power conductor with the breaker terminal, means within the sheath for interrupting the continuity of the power leads, means for interrupting the continuity of the body of liquid within the sheath in the region of interruption of the continuity of the leads, said last named means comprising a grounded barrier extending across the sheath and movable vertically downward into a position between the interrupted lead ends, and a window in the run of sheath adjacent to the barrier and obstructed by the barrier when the barrier is in any position other than its normal lowered position.

HERMAN C. KALWITZ.

CERTIFICATE OF CORRECTION.

Patent No. 1,944,661.　　　　　　　　　　　　　　　　　　January 23, 1934.

HERMAN C. KALWITZ.

It is hereby certified that error appears in the printed specification of the above numbered patent requiring correction as follows: Page 8, line 136, claim 10, and page 9, line 3, claim 11, for "boxes" read box; page 8, line 137, claim 10, and page 9, line 4, claim 11, for "bushings" read bushing; and that the said Letters Patent should be read with these corrections therein that the same may conform to the record of the case in the Patent Office.

Signed and sealed this 27th day of February, A. D. 1934.

F. M. Hopkins (Seal)　　　　　　　　　　　　　　　　　　　　　　　Acting Commissioner of Patents.